United States Patent Office 3,574,160
Patented Apr. 6, 1971

3,574,160
PROCESSING AIDS
Nelson Nae-Ching Hsu, Stamford, Conn., assignor to American Cyanamid Company, Stamford, Conn.
No Drawing. Filed Dec. 7, 1967, Ser. No. 688,675
Int. Cl. C08f 45/44
U.S. Cl. 260—30.4
4 Claims

ABSTRACT OF THE DISCLOSURE

Compositions comprising difficultly processable thermoplastic resins containing various furfuryl and picoline materials as processing aids and a process for the production thereof are disclosed. These resins are the polyimides, the polysulfones, the polyphenylene oxides, and the polycarbonates.

CROSS-REFERENCES TO RELATED APPLICATIONS

Various of the polyimide resins, the processability of which may be improved according to the instant invention, are disclosed and claimed in U.S. patent application, Ser. No. 589,521, filed Oct. 26, 1966, or U.S. patent application 392,635, filed Aug. 27, 1964, and said applications are hereby incorporated herein by reference.

BACKGROUND OF THE INVENTION

Many thermoplastic resins are useful in a multiplicity of applications but suffer from their inability to be processed thermally at elevated temperatures. These polymers etc., when so treated, tend to undergo heat-induced or mechanical degradation which is harmful to the desired properties of the ultimate material.

SUMMARY

I have now found a group of materials which may be added to these difficultly processable resins, without detriment to their basic optimum properties, and thereby render them thermally processable at elevated temperatures. For example, by adding these various compounds to such resins, the resultant compositions may be extruded, injection molded, etc. at a lower torque requirement and at a faster rate than without the added material. Additionally, very inconsequential, if any, lowering of the physical and chemical properties of the resin are experienced.

DESCRIPTION OF THE INVENTION INCLUDING PREFERRED EMBODIMENTS

As mentioned above, I have found that various compounds may be added to various resins and polymers in order to render them more easily processable. These so-called processing aids can be represented by Formulae I and II, below.

(I) 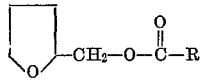

and (II) 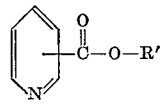

Wherein R and R' are, individually, saturated or unsaturated, aliphatic radicals of 11–17 carbon atoms, inclusive.

These compounds are all well known in the art and include tetrahydrofurfuryl oleate,
tetrahydrofurfuryl linoleate,
tetrahydrofurfuryl linolenate,
tetrahydrofurfuryl stearate,
tetrahydrofurfuryl palmitate,
tetrahydrofurfuryl myristate,
tetrahydrofurfuryl laurate,
lauryl picolinate,
myristyl picolinate,
cetyl picolinate,
linolenyl picolinate,
stearyl picolinate, and the like.

Although both classes of materials function effectively as processing aids according to the instant invention, those compounds represented by Formula I are preferred because of their availability and the fact that they give somewhat more beneficial results when incorporated into resinous systems as disclosed herein.

These processing aids may be incorporated into the desired resinous material in amounts ranging from about 0.1% to about 5.0%, preferably, from about 0.5% to about 3.0%, by weight, based on the total weight of the resin.

The compounds represented by Formulae I and II above, may be incorporated into the resin anytime prior to actual thermal treatment or processing thereof and even during the manufacture, i.e. polymerization etc., of the resin, without detracting from the beneficial effect they produce after incorporation.

The resinous materials which may be beneficially enhanced by the addition of the above materials include any thermoplastic resin which is thermally processable and which suffers from the disability of not being able to be processed at elevated temperatures without degradation. Such resinous materials include polycarbonates such as those produced from phosgene and Bisphenol A having the structure

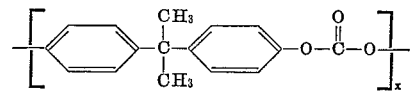

polysulfones, i.e. those produced from p,p'-di(chlorophenyl)sulfone and Bisphenol A, polyphenylene oxides, i.e. those produced from 2,6-dimethyl-4-bromophenol and the like.

A preferred class of resins that have been shown to be beneficially enhanced by the addition of the above-described processing aids are those polyimides disclosed and claimed in the above-incorporated patent applications.

Generally, these polyimide resins are represented by the structure

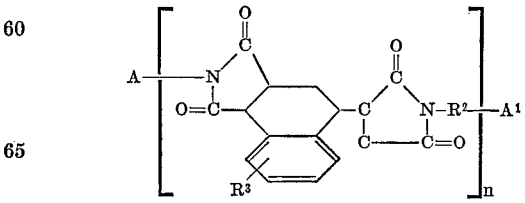

wherein $R^2$ is a divalent organic radical, $R^3$ is hydrogen or an alkyl group, $n$ is a whole, positive integer of 2–400, inclusive, A is $R^2$—$NH_2$ or

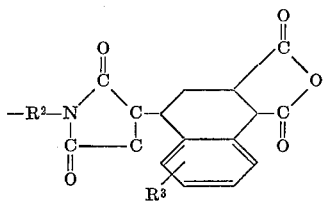

and $A^1$ is —$NH_2$ or

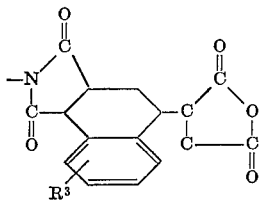

These polyimides are produced by reacting 3,4-dicarboxy - 1,2,3,4 - tetrahydro-1-naphthalenesuccinic dianhydride or its alkyl derivatives with a suitable diamine as disclosed in said applications.

Another preferred group of polyimide resins is those produced from (a) 3,4-dicarboxy-1,2,3,4-tetrahydro-1-naphthalenesuccinic dianhydride, (b) suitable diamine and (c) a different dianhydride of an organic tetracarboxylic acid as disclosed in said 392,635 application, the mol percent ratio of (b):(c) being between about 35:65 and 65:35, respectively.

Suitable diamines include those of the formula $$H_2N-X-NH_2$$

wherein X may be any divalent aromatic, aliphatic, cycloaliphatic, combination of aromatic and aliphatic, heterocyclic or bridged organic groups wherein the bridge is oxygen, nitrogen, sulfur, silicon, phosphorus etc. The preferred X groups are those containing at least 6 carbon atoms characterized by benzenoid unsaturated such as

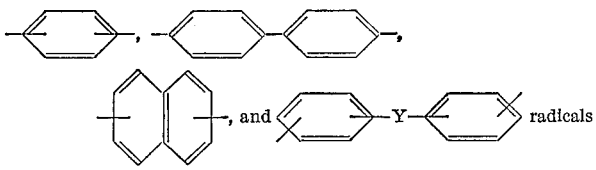 radicals wherein Y is a bridging group, as described above, including alkylene. Examples of diamines include:

para-phenylene diamine;
4,4'-diamino-diphenyl methane;
4,4'-diamino-diphenyl sulfide;
3,3'-diamino-diphenyl sulfone;
4,4'-diamino-diphenyl ether;
bis-(4-amino-phenyl)diethyl silane;
1,5-diamino naphthalene;
2,4-bis(beta-amino-t-butyl)toluene;
bis-(para-beta-amino-t-butyl-phenyl)ether;
p-xylylene diamine;
hexamethylene diamine;
2,2-dimethyl propylene diamine;
$H_2N(CH_2)_3O(CH_2)_2O(CH_2)_3NH_2$
bis-(4-aminophenyl)phenyl phosphine oxide
4,4'-diamino-diphenyl-phenyl phosphate, etc.

Examples of dianhydrides other than those discussed above include pyromellitic dianhydride, 3,3',4,4'-benzophenone tetracarboxylic dianhydride, 1,2,3,4-cyclopentane tetracarboxylic dianhydride, 2,2-bis(3,4-dicarboxyphenyl)propane dianhydride, bis(3,4-dicarboxyphenyl)ether dianhydride, cyclobutane dianhydride, 1-methyl-7,8-diphenylbicyclo[222] - 7 - octane-2,3,5,6-tetracarboxylic dianhydride, 1,4,5,8-naphthalene tetracarboxylic dianhydride and the like. The 1,2,3,4-cyclopentane tetracarboxylic acid is disclosed in Alder et al. C.A. vol. 50, 1956, pp. 14572–3, inclusive.

As mentioned above, my novel compositions may be extruded, injection molded or otherwise thermally processed. They may be further treated by the addition thereto of known materials such as glass fibers, wood pulp, papers, clay, aluminum, carbonates, ultraviolet light absorbers, antioxidants, photochromic materials, dyes, pigments and the like.

The following examples are set forth for purposes of illustration only and are not to be construed as limitations on the instant invention except as set forth in the appended claims. All parts and percentages are by weight unless otherwise specified.

EXAMPLE 1

(A) Preparation of polyamide

To a suitable reaction vessel equipped with stirrer and thermometer there are introduced 79.2 parts (0.4 mole) of p,p'-diamino-diphenylmethane dissolved in 470 parts of pyridine. To the above agitated solution is added slowly 120 parts (0.4 mole) of 3,4-dicarboxy-1,2,3,4-tetrahydro-1-naphthalenesuccinic dianhydride over a four hour period. The temperature is kept below 35° C. during the course of the reaction. A viscous solution results which is diluted with 189 parts of pyridine.

(B) Addition of processing aid

To the resultant polyamide is added 1.0 weight percent of tetrahydrofurfuryl oleate. The blend is mixed and then devolatilized and imidized by heating to 200° C. for 3 hours under vacuum. The resultant product is extruded with a C. W. Brabender Model 250 extruder and pelletized. The pellets were then injection molded by a New Britain Ankerwerk Model 175 machine. The results, utilizing varying amounts of oleate as against a control with no oleate, are set forth in Table I, below.

TABLE I

| Percent THFO [1] | Extrusion temp., °C., range | Torque requirement | |
|---|---|---|---|
| | | R.p.m. | Metergrams |
| 0 | 330–368 | 70 | 5,500 |
| 0.75 | 316–372 | 75 | 5,000 |
| 1.0 | 303–350 | 79 | 4,250 |
| 1.5 | 305–351 | 70 | 4,000 |
| 2.0 | 303–350 | 68 | 4,000 |

[1] THFO = Tetrahydrofurfuryl oleate.

It can be seen that the addition of the tetrahydrofurfuryl oleate reduces the minimum temperature at which the polyimide can be extruded and also widens the range at which extrusion can be conducted. Additionally, the amount of energy required to extrude the blend is beneficially reduced as compared to the polyimide alone.

Following the procedure of Example 1 various other processing aids were incorporated into various resins and the resultant compositions extruded. The results are set forth in Table II, below.

TABLE II

| Example | Processing aid, percent | Resin | Results of extrusion |
|---|---|---|---|
| 2 | Tetrahydrofurfuryl palmitate, 1.0% | Polyimide of Example 1 | Excellent, low torque. |
| 3 | Cetyl picolinate, 2.0% | do | Very good, low torque. |
| 4 | Tetrahydrofurfuryl stearate, 0.5% | Polysulfone | Do. |
| 5 | Tetrahydrofurfuryl laurate, 5.0% | Polyphenyleneoxide | Good, torque substantially reduced. |
| 6 | Lauryl picolinate, 1.0% | Polycarbonate | Do. |
| 7 | Stearyl picolinate, 3.0% | Polyimide produced as in Ex. 1 except that pyromellitic dianhydride is also incorporated into the monomer charge. | Do. |

What is claimed is:

1. A composition of matter comprising (1) a thermoplastic resin which is thermally processable and which suffers from the disability of not being able to be processed at elevated temperatures without degradation, wherein the resin is chosen from the polyimides, the polysulfones, the polyphenylene oxides, and the polycarbonates, and (2) from about 0.1% to about 5.0%, by weight, based on the weight of (1), of a compound having the formula

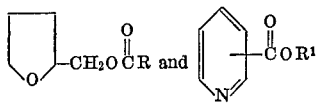

wherein R and R$^1$ are, individually, saturated or unsaturated aliphatic hydrocarbon radicals of 11–17 carbon atoms, inclusive.

2. A composition according to claim 1 wherein (2) is tetrahydrofurfuryl oleate.

3. A composition according to claim 1 wherein (1) is a thermoplastic resinous reaction product having recurring units of:

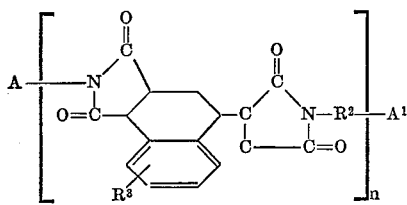

wherein R$^2$ is a divalent organic radical, R$^3$ is selected from the group consisting of hydrogen and an alkyl group containing from 1 to 7 carbon atoms, $n$ is a whole positive integer between 2 and 400, inclusive, A is a member selected from the group consisting of —R$^2$—NH$_2$ and

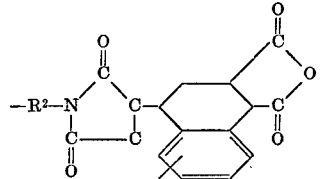

and A$^1$ is a member selected from the group consisting of —NH$_2$ and

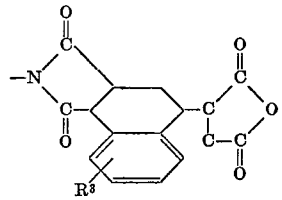

4. A composition according to claim 1 wherein (1) is a polyimide of (a) a diamine, (b) 3,4-dicarboxy-1,2,3,4-tetrahydro-1-naphthalenesuccinic dianhydride and (c) a different dianhydride, the mol percent ratio of (b):(c) being between about 35:65 and 65:35, respectively.

References Cited

UNITED STATES PATENTS

| 3,247,165 | 4/1966 | Rodia | 260—78TF |
| 3,433,795 | 3/1969 | Hyden et al. | 260—30.2 |
| 3,440,215 | 4/1969 | Holub | 260—78TF |

OTHER REFERENCES

Modern Plastics Encyclopaedia 1966 (September 1965), McGraw-Hill (N.Y.), pp. 452–453.

Doolittle, Technology of Solvents and Plasticizers (Wiley) (N.Y.) (1954) p. 947.

MORRIS LIEBMAN, Primary Examiner

H. H. FLETCHER, Assistant Examiner

U.S. Cl. X.R.

260—30.2, 45.8, 78; 264—211